United States Patent Office 3,542,684
Patented Nov. 24, 1970

---

3,542,684
VOLTAGE STABILIZED POLYOLEFIN DIELECTRIC COMPOSITIONS USING LIQUID-AROMATIC COMPOUNDS AND VOLTAGE STABILIZING ADDITIVES
George H. Hunt, West Newton, Mass., assignor to Simplex Wire and Cable Company, Cambridge, Mass., a corporation of Massachusetts
No Drawing. Continuation-in-part of application Ser. No. 649,355, June 27, 1967, now Patent No. 3,445,394, which is a continuation of application Ser. No. 367,718, May 15, 1964. This application Oct. 2, 1968, Ser. No. 764,651
Int. Cl. H01b 3/18
U.S. Cl. 252—63.2           49 Claims

ABSTRACT OF THE DISCLOSURE

A dielectric composition is disclosed consisting of a solid phase polyolefin, e.g., polyethylene having dispersed therein a blend of a normally liquid aromatic compound and a voltage stabilizing additive. The voltage stabilizing additives include the halogenated polycyclic aromatic compounds and substituted aromatic hydrocarbon compounds characterized by having an electron acceptor group and an electron donor group potentially hydrogen bonded together by a reversibly transferable proton. Suitable electron acceptor groups include —NO$_2$, —CO, —CN, phenyl and polycyclic aryl; and suitable electron donor radicals include amino, lower alkyl and fluoro. The voltage stabilizing additive is present in amounts ranging from 5 to 50 parts by weight per 100 parts by weight of aromatic oil, and the total amount of the oil and additive blend present in the polyolefin ranges from 1 to 10 percent by weight based on the polyolefin. Suitable aromatic liquids include quinaldene, quinoline, isoquinoline, indene, polychlorinated biphenyl and orthonitrotoluene.

CROSS REFERENCES TO RELATED APPLICATIONS

This application is a continuation-in-part of my copending application Ser. No. 649,355, filed June 27, 1967 now Pat. No. 3,445,394 which was a continuation of my prior application Serial No. 367,718, filed May 15, 1964 and now abandoned.

BACKGROUND OF THE INVENTION

Field of the invention

This invention relates to electrical insulating materials of great dielectric strength for use at high voltages such as on the order of kilovolts and more particularly to solid polyolefin, e.g., polyethylene dielectrics of improved voltage stability for use as insulation in power cables.

Description of the prior art

In the recent past, synthetic high-polymers have found increasing application as insulating materials in various electrical arts. In particular, solid olefin polymers, chiefly polyethylenes, and polypropylene, for example, are generally suitable as insulating materials for electric cables and wires due to their good mechanical properties and workability in conjunction with excellent electrical properties. For high voltage purposes, however, the use of such substances has been possible only within narrow limits because their theoretical electrical breakdown strength in practice is not even approached.

It has been theorized that the relative weakness of commercially prepared polyolefin insulation results from the many small flaws and air spaces formed during manufacture which are virtually impossible to prevent in commercial manufacturing processes. For example, small particles of foreign matter will always be present in the hydrocarbon matrix. Careful examination of many test failures has now revealed that these small flaws often initiate the growth of a fault in the insulation, with the actual growth of the fault, which results in failure, being due to electron avalanches derived from the current in the cable which produce ionization and subsequent failure at the flaw. A method of reducing the ability of foreign matter to initiate faults, i.e., a method to delay or prevent the occurrence of such electron avalanches, would obviously result in an overall increase in electrical breakdown strength.

A number of additives have been recently found which greatly increase the resistance of polyolefins, such as low density polyethylene, to electrical breakdown. Such additives are described, for example, in application Ser. No. 132,584 of Gross and Hunt, filed Aug. 21, 1961, now abandoned; Pat. No. 3,350,312, issued Oct. 31, 1967 to Gross and Hunt; Pat. No. 3,346,500, issued Oct. 10, 1967 to Hunt; and copending application Ser. No. 732,486, filed May 7, 1968, in the name of Lawrence J. Heidt and in the application of George H. Hunt concurrently filed herewith for "Voltage Stabilized Polyolefin Dielectric."

These additives, however, are not pure hydrocarbons as is the polyolefin, e.g., polyethylene matrix and, therefore, when added to the polyolefin in large amounts, may undesirably change the dielectric constant and power factor thereof particularly when the desired improvement in voltage stability requires amounts of additive in excess of its solubility since addition of the additive in excess of its solubility causes its crystallization in the polyolefin with consequent weakening of the entire structure electrically by creating physical discontinuities.

In my application Ser. No. 649,355, filed June 27, 1967, it is disclosed that certain beneficial results can be obtained by adding the voltage stabilizing additives to the polyolefin base by blending the additive with a highly aromatic compound, e.g., with an aromatic hydrocarbon oil. It has been found as disclosed in my prior application that by blending the voltage stabilizing additives with an aromatic compound which is normally liquid that the additives which are mostly solids at room temperature can be dissolved in the aromatic liquid and added to the polyethylene at room temperature thus avoiding the high temperature blending, for example, on hot rolls. Also, it was found that by blending the voltage stabilizing additives with hydrocarbon oils that greater voltage stabilization could be achieved than would be possible using the additive alone even in increased amounts.

SUMMARY OF THE INVENTION

It has now been found that in addition to the aromatic compounds disclosed as useful in my prior application that the voltage stabilizing additives can be blended with the following normally liquid aromatic compounds with highly advantageous results: quinaldene, quinoline, isoquinoline, indene, chlorinated biphenyl and orthonitrotoluene. In selecting the aromatic liquid vehicle to be used in the present invention, it is important that the vehicle be of relatively low viscosity in order to permit effective tumble mixing of the liquid-additive blend with the polyolefin base. The vehicle must also be soluble in the polyethylene up to a useful concentration as set out more fully below. The vapor pressure of the liquid vehicle must be sufficiently high that it will diffuse into the polyolefin base in a reasonable time at normal ambient temperatures but must not be so high as to cause excessive loss in processing or cable installation. It is preferred to use aromatic hydrocarbon liquids which exhibit voltage stabilizing properties in polyolefins or which enhance the activity of the additive blended therewith and, of course, the liquid should readily dissolve the voltage stabilizing additive without adverse or inhibiting reactions between the aromatic liquid and the voltage stabilizing additive. Further, the aromatic liquid should be relatively non-polar and non-hygroscopic which properties would otherwise have adverse effects upon the insulating properties of the polyolefin insulation. Other desirable properties of the aromatic liquid include low cost, ready availability and low toxicity.

This invention provides advantages in the processing of polyolefin compositions since the mobile aromatic liquids used make it possible to incorporate the additive-liquid blend into the polyolefin by a simple tumbling operation. Further, these blends provide wide flexibility in the ingredients to be compounded both as to the type and amount of additive used. Finally, in respect to additives having relatively low solubilities in polyethylene, the present invention facilitates the uniform blending of relatively small amounts, e.g., on the order of .1 to .2 percent, of solid additive based upon the polyolefin base.

Voltage stabilizing additives which may be incorporated into the liquid aromatic compounds to form the blends in accordance with the present invention include halogenated cyclic hydrocarbons such as chlorinated biphenyl; 4,4'-dibromobiphenyl; 9,10-dibromoanthracene; 4-bromobiphenyl; 4-iodobiphenyl; and 2-chloronaphthalene; and substituted aromatic hydrocarbons such as 2,4,6-trinitrotoluene; 2-nitrodiphenylamine; 2,4-dinitrodiphenylamine; o-nitroanisole; 2,6-dinitrotoluene; 2,4-dinitrotoluene; o-nitrobiphenyl; diphenylamine; 2-nitroaniline; anthranilonitrile; 1-fluoro-2-nitrobenzene; chloranil; 2,6-dinitroaniline; diparamethoxy diphenylamine; o-nitrotoluene; N-nitroso-N-phenyl-benzylamine; N-nitroso carbazole; N-nitroso-diphenylamine; azobenzene; 4-methyl-2-nitroaniline; p-phenyl azoaniline; ω-nitro styrene; 2,2'-dinitrobiphenyl; phenyl - alpha - naphthalene; phenyl - beta - naphthalene; N,N'-diphenyl, paraphenylenediamine; benzidene; mixtures thereof and mixtures thereof with at least one of m-dinitrobenzene, m-nitroaniline, p-nitroaniline, m-nitrotoluene, p-nitrotoluene, o-nitrochlorobenzene and p-nitrochlorobenzene. These additives have in common the following features:

(1) An electron acceptor group, especially a strongly unsaturated group, e.g., one containing a π bond such as —$NO_2$, CO, —CN, phenyl and polycyclic aromatics.

(2) An electron donor group, especially one containing a transferable proton such as amino and lower alkyl groups, e.g., $NH_2$ and —$CH_3$.

(3) Potential hydrogen bonding between the acceptor and donor groups by a transferable proton such as when the acceptor and donor groups are ortho with respect to one another, e.g., on a benzene ring.

(4) Reversibility of the proton transfer between the acceptor and donor groups, such as in the keto-enol isomerization.

(5) Structure and bonds between the acceptor and donor groups which favor transfer of charge and energy such as a planar or near planar structure of a conjugated system of alternating single and double bonds.

(6) Adequate size and complexity of the conjugated system to provide for electron capture and subsequent energy dissipation without producing irreversible bond rupture.

(7) Adequate solubility of the additive in the polyolefin insulation material to provide a sufficient number of centers for the capture of objectionable contaminants such as oxygen and of the electrons moving in the electric field.

With respect to requirement (7) above, it will be apparent that the enhanced stabilization achieved utilizing the blends of the present invention lessens the importance of solubility of the stabilizing additive, since smaller amounts can be used thus keeping the proportion of stabilizing additive within its soluble limits.

The voltage stabilizing additives are for the most part solids at normal temperatures and hence must be blended with the polyolefin insulant at elevated temperatures at which the polyolefin is liquid. The inconvenience of such a blending operation can be eliminated with the blends of the present invention as the liquid aromatic compounds dissolve the solid stabilizing additives to yield liquid blends which can be readily admixed with polyolefin extrusion powder by tumbling or similar techniques.

Those voltage stabilizing additives which are normally liquid, e.g., o-nitrotoluene and chlorinated biphenyl may be used in the practice of my invention as either the additive or the liquid vehicle. Chlorinated biphenyl is commercially available under the trade name Arochlor consisting of a mixture of chlorinated biphenyls. When using Arochlor primarily as a voltage stabilizing additive, the more viscous and highly chlorinated variety is used, e.g., Arochlor 1260 or Arochlor 1262. On the other hand, when using these compounds primarily as the liquid vehicle of the present invention, the less viscous and less chlorinated Arochlors are used, e.g., Arochlor 1232, 1242, and 1248. (The last two digits in each designation indicates the approximate weight percentage of chlorine in the product).

The additive-oil blends of the present invention are particularly effective with polyolefins such as low density polyethylene base compositions which generally have a density on the order of .92 to .95 and a melt index between 0.2 and 2.0. Specifically, the polyethylenes to which I refer are those solid polymers of ethylene prepared by the "high pressure" process. The blends are also effective as voltage stabilizers in high density (low pressure) polyethylenes and in other polyolefins, e.g., polypropylene. The polyolefin compositions stabilized in accordance with the present invention can, if desired, contain minor amounts of the usual additives, adjuvants and fillers conventionally employed in polyethylene compositions, such as carbon black, pigments, anti-oxidants, heat stabilizers and oxone resistance stabilizers. The additive-oil blends of the present invention are also useful in increasing the voltage stability of solid polyolefin compositions over a long period of time where the polyolefin compositions contain minor amounts of rubbery polymers and copolymers of such olefins as propylene, isobutylene and isoprene. Additionally, the blends can be used with polyethylene compositions which have been cross-linked using, for example, a peroxide catalyst, e.g., dicumyl peroxide, 2,5-bis(tertiary-butylperoxy)2,5-dimethyl hexane, 2,5-dimethyl-2,5-di(tertiary-butylperoxy)hexyne-3, etc., or irradiation on the order of 10 to 15 megarads with cobalt 60 or a linear accelerator, or the like.

A variety of proportions can be used in preparing the blends of the highly aromatic compound and the voltage stabilizing additive. Since the aromatic liquids, per se, also exhibit some voltage stabilizing properties in polyolefins, the proportions chosen are likely to be those which are the most economically attractive, although it will be appreciated other considerations, e.g., effectiveness can also affect the choice of proportions. As little as 5 parts by weight, and up to 40 to 50 parts, of a stabilizing additive such as 2,4-dinitrotoluene in 100 parts by weight of aromatic liquid can be used. 25 parts of the active stabilizing additive per 100 parts of the aromatic oil or hydrocarbon is a convenient and effective blend.

The blend of highly aromatic hydrocarbons and voltage stabilizing additive is used in the polyolefin, e.g., polyethylene in an amount effective to act as a voltage stabilizer. Such amounts are, for example, from about 1 to 10%, preferably 2 to 5%, by weight based on the amount of polyolefin. Where copious blooming or bleeding of the aromatic oil out of the polyolefin is objectionable, the upper limit for the amount of aromatic oil in the polyolefin, e.g., polyethylene, is about 8% by weight, preferably 5 to 6%, since a heavy bleeding may occur at about 8% by weight.

In practice, it is frequently desirable to apply a semi-conducting shield over a stranded conductor, e.g., of copper, in order to decrease the possibility of an electrical discharge in voids between the conductor and the inner surface of overlying insulation with resulting deterioration of the dielectric. The shield, known as a strand shield, typically is an extruded coating of a semi-conducting polyolefin material, e.g., polyethylene containing conductive material such as carbon black. Solid polyolefins are also employed as cable jackets, in which case they are frequently compounded with carbon black or other pigments.

In accordance with the present invention, a considerable improvement in the electrical breakdown strength of a polyethylene insulated high voltage cable can also be obtained by adding a proportion of the additive-oil blends described above to the strand shield, or other semi-conducting layer, when used, and to the cable jacket, if it is polyolefin based. Because the strand shields are in the zone of greatest hazard of imperfection, however, a larger amount of stabilizer is used than is used in the insulation. About 2 to 20% by weight of additive-oil blend, particularly about 10%, has been found suitable for use with a semi-conductive strand shield composition.

A typical strand shield can be formed using the same polyolefin material used for the overlying insulation, or a similar extrudable material, which contains a material, e.g., carbon black, which renders it semi-conductive. A strand shield composition can, for example, be formed of a polyethylene-acrylate copolymer containing 30 to 40 parts of semi-conducting carbon black per 100 parts by weight of copolymer which gives a resistivity of about 100 ohm.-cm. A weather-proof jacket for a cable can also be the same polyolefin base material used for insulation or, if desired, any other weather-proof material which may be easily applied to the cable. A typical weatherproof black material is formed by incorporating into polyethylene, e.g., having a density of 0.92 and a melt index of 0.3, about 2½ to 3 parts of a well-dispersed finely divided carbon having an average size of 10–20 m$\mu$ per 100 parts by weight of polyethylene.

The following examples serve to illustrate the improved results obtainable by blending aromatic liquids and voltage stabilizing additives with polyethylene according to my invention:

EXAMPLES 1–11

A number of tests, summarized in Table I, were made to ascertain the long time voltage stability at different voltages with polyethylene solid dielectric compositions employing a polyethylene base DFDA 6506, a commercially available polyethylene composition which includes a small amount of a polypropylene polymer having a melt index of .25 and a density of .92 and containing traces of a commercial stabilizer, i.e., stearically hindered thiophenol (Santo-white crystals).

A series of eight samples were tested for each composition. The first series of samples tested were made of polyethylene DFDA 6506 without voltage stabilizing additives. The other compositions tested contained polyethylene DFDA 6506 and a blend of a voltage stabilizing additive and an aromatic hydrocarbon liquid in the amount and type indicated in the table. All examples containing the blend were prepared by tumble mixing the granular extrudable polyethylene and the liquid additive blend at room temperature, and extruding the mixture in a conventional manner. The resulting solid polyethylene was then cut into identical samples each being a cube of about one cm.

Each of the samples was subjected at room temperature of a uniform alternating current voltage and examined for evidence of high voltage breakdown in accordance with the single needle test in "An Accelerated Screening Test For Polyethylene High Voltage Insulation," AIEE Transaction Paper No. 62–53 (1962), By D. W. Kitchin and O. S. Pratt. In this test a "standard defect" is used to determine the relative dielectric strength and to indicate the probable voltage life of the polyethylene insulation by inspection for "treeing," a characteristic generally accepted as an early stage of dielectric breakdown. The "standard defect" consists of a needle imbedded in a sample of polyethylene under controlled conditions. The sample blocks are then mounted so that the points of the needles are always the same distance from a ground plane electrode (2⅞ inches), and the sample is stressed by applying a voltage between the needle and ground for one hour. The sample is then inspected under a microscope at 25× for detectable "trees" as evidence of electrical failure. Visible damage is rated as a failure.

The needle test has been shown to correlate well with the results of voltage life tests on wires. This is true of polyethylene with voltage stabilizing additives, as well as conventional polyethylene formulations. In order to demonstrate this correlation, the compositions shown in Table 1 were subjected to wire tests by applying the compositions in a 70 mil wall thickness insulation on a No. 12 solid copper wire. The wire was then subjected to a 15 minute step rise test in which the wires were subjected to a voltage stress which was increased in 10 kv. increments at 15 minute intervals. Certain compounds were also tested using a 30 minute step rise test in which the voltage was increased in 10 kv. increments at 30 minute intervals. The results of these tests (based upon an average of six samples tested) are shown as the logarithmic mean volts per mil per hour at failure.

TABLE I

| Example No. | 1 | 2 | 3 | 4 | 5 | 6 | 7 | 8 | 9 | 10 | 11 |
|---|---|---|---|---|---|---|---|---|---|---|---|
| Composition: Parts by weight | | | | | | | | | | | |
| Base: DFDA 6506 | 100 | 100 | 100 | 100 | 100 | 100 | 300 | 300 | 100 | 100 | 100 |
| Aromatic liquid: | | | | | | | | | | | |
| Quinoline | | 2 | | 1 | | | | | | | |
| Idene | | | 2 | | 1 | | | | | | |
| Arochlor 1232 | | | | | | | | | | 2 | 2 |
| Arochlor 1242 | | | | | | | 2 | 2 | 3 | | |
| Orthonitrotoluene | | | | 1 | 1 | 2 | .25 | .5 | .75 | | |
| Voltage stabilizing additive: | | | | | | | | | | | |
| Diphenylamine | | .25 | .25 | .5 | .5 | .5 | .25 | | | .5 | .25 |
| 2,4-dinitrotoluene | | .25 | .25 | .5 | | | | | | | .25 |
| Needle test: Number of sample failures of 8 tested | | | | | | | | | | | |
| Test voltage, kv.: | | | | | | | | | | | |
| 10 | 4 | | | | | | | | | | |
| 15 | 8 | | | | | | | | | | |
| 50 | | 1 | 1 | 0 | 0 | | | | | | |
| 60 | | 2 | 7 | 1 | 0 | | 2 | 0 | 2 | 2 | 1 |
| Wire test: Log mean volts per mil per hour | | | | | | | | | | | |
| 15 min. step rise | 570 | 710 | 660 | 610 | 698 | 779 | 795 | 645 | 995 | | |
| 30 min. step rise | | | | | | | | 688 | 790 | 800 | |

EXAMPLES 12–55

In order to demonstrate the flexibility of the compositions which can be used in accordance with the present invention, compositions were prepared using the various aromatic liquids disclosed herein blended with a variety of voltage stabilizing additives. These compositions were subjected to the needle test as described in Examples 1–11 and the results are reported in Table II.

EXAMPLES 56–71

The present invention is not limited to the use of a polyethylene base containing an aromatic liquid and single additive blend. On the contrary, combinations of additives can be combined with any of the aromatic liquids disclosed herein. This use of blends containing mixtures of additives was demonstrated by preparing a series of compositions using the various aromatic liquids disclosed herein blended with equal parts of two voltage stabilizing additives. These compositions were subjected to the needle test, as described in Examples 1–11, and the results are reported in Table III.

TABLE II

| Example No. | 12 | 13 | 14 | 15 | 16 | 17 | 18 | 19 | 20 | 21 | 22 |
|---|---|---|---|---|---|---|---|---|---|---|---|
| Base: 100 parts by weight | | | | | DFDA 6506 | | | | | | |
| Aromatic liquid: 2 parts by weight | | | | | Arochlor 1242 | | | | | | |
| Additive code:[1] 0.5 part by weight | h | i | j | k | l | m | a | b | c | d | e |
| Needle test: Number of sample failures of 8 tested | | | | | | | | | | | |
| Test voltage, kv.: | | | | | | | | | | | |
| 50 | 3,5 | 0,3 | 4,4 | 5 | 8 | 3 | 8 | 8 | 0 | 3 | 6 |
| 40 | | | | | | | | | | | |
| 30 | | | | | 4 | | 5 | 1 | | | |
| 20 | | | | | | | | | | | |

| Example No. | 23 | 24 | 25 | 26 | 27 | 28 | 29 | 30 | 31 | 32 | 33 |
|---|---|---|---|---|---|---|---|---|---|---|---|
| Base: 100 parts by weight | | | | | DFDA 6506 | | | | | | |
| Aromatic liquid: 2 parts by weight | (2) | (2) | | | | | Indene | | | | |
| Additive code:[1] 0.5 part by weight | f | g | h | i | j | k | l | m | a | b | c |
| Needle test: Number of sample failures of 8 tested | | | | | | | | | | | |
| Test voltage, kv: | | | | | | | | | | | |
| 50 | 6 | 8 | 8 | 8 | | | | | | | |
| 40 | | | | | 8 | 7 | 2 | 8 | 4 | 3 | 2 |
| 30 | | | 4 | 7 | 3 | 7 | 4 | 8 | | | |
| 20 | | | | | | | | 0 | | | |

| Example No. | 34 | 35 | 36 | 37 | 38 | 39 | 40 | 41 | 42 | 43 | 44 |
|---|---|---|---|---|---|---|---|---|---|---|---|
| Base: 100 parts by weight | | | | | DFDA 6506 | | | | | | |
| Aromatic liquid: 2 parts by weight | | Indene | | | | | Quinoline | | | | |
| Additive code:[1] 0.5 part by weight | d | e | f | g | h | j | l | b | e | g | (3) n |
| Needle test: Number of sample failures of 8 tested | | | | | | | | | | | |
| Test voltage, kv.: | | | | | | | | | | | |
| 50 | | | | | | | | | | | |
| 40 | | 7 | 8 | | | | | | | | |
| 30 | | 7 | 4 | 4 | 8 | 0 | 0 | 0 | 0 | 0 | 1 |
| 20 | | | | | 0 | | | | | | |

| Example No. | 45 | 46 | 47 | 48 | 49 | 50 | 51 | 52 | 53 | 54 | 55 |
|---|---|---|---|---|---|---|---|---|---|---|---|
| Base: 100 parts by weight | | | | | DFDA 6506 | | | | | | |
| Aromatic liquid 1: 2 parts by weight | | Isoquinoline | | | | | Quinaldine | | | | |
| Additive code: 0.5 parts by weight | j | l | b | e | g | h | j | l | b | e | g |
| Needle test: Number of sample failures of 8 tested | | | | | | | | | | | |
| Test voltage, kv: | | | | | | | | | | | |
| 50 | | | | | | | | | | | |
| 40 | | | | | | | | | | | |
| 30 | 0 | 1 | 1 | 1 | 0 | 1 | 1 | 1 | 3 | | 1 |
| 20 | | | | | | | | | | | |

[1] The following code is used above to designate the voltage stabilizing additive used in the compositions tested: a—p-Nitrosodiphenylamine; b—N-nitrosodiphenylamine; c—Anthranilonitrile; d—Azobenzene; e—Chloranil; f—Phthallic anhydride; g—Benzoguanamine; h—Orthonitrobiphenyl; i—2,6-dinitrotoluene; j—2,4-dinitrodiphenylamine; k—Orthonitroanisole; l—ω-Nitrostyrene; m—Triphenylformazan; n—Orthonitrotoluene.
[2] Arochlor 1242.
[3] Isoquinoline.

TABLE III

| Example No. | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|
| Base: 100 parts by weight | | | | | | | | DFDA 6506 | | | | | | | | |
| Aromatic liquid: 2 parts by weight | | Arochlor 1242 | | | | Indene | | | | Quinoline | | | | Arochlor 1248 | | |
| Additive code:[1] 0.25 part by weight each | h,g | i,g | i,e | h,f | h,g | i,g | i,e | h,f | h,g | i,g | i,e | h,f | h,g | i,g | i, | h,f |
| Needle test: Number of sample failures of 8 tested | | | | | | | | | | | | | | | | |
| Test voltage, kv.: | | | | | | | | | | | | | | | | |
| 50 | | | | | | | | | | | | | | | | |
| 40 | | | | | | | | | | | | | | | | |
| 30 | 1 | 3 | 0 | 2 | 8 | 4 | 0 | 3 | 1 | 0 | 1 | 0 | 2 | 3 | 0 | 2 |
| 20 | | | | | 0 | | | | | | | | | | | |

[1] The following code is used above to designate the voltage stabilizing additive used in the compositions tested: a—p-Nitrosodiphenylamine; b—N-nitrosodiphenylamine; c—Anthranilonitrile; d—Azobenzene; e—Chloranil; f—Phthallic anhydride; g—Benzoguanamine; h—Orthonitrobiphenyl; i—2,6-dinitrotoluene; j—2,4-dinitrodiphenylamine; k—Orthonitroanisole; l—ω-Nitrostyrene; m—Triphenylformazan; n—Orthonitrotoluene.

It should be pointed out that the present invention encompasses only those combinations of additives and aromatic liquids which are compatible. Certain combinations of aromatic liquids and the voltage stabilizing additives react to give a product which is not capable of use in accordance with this invention. An example of such an incompatible combination is shown in Example 54, i.e., the combination of quinaldine and chloranil. It will be noted that no needle test data for this combination is shown in Table II.

In carrying out the large number of experiments shown in Tables I–III, relatively constant additive concentrations were used in order to provide a basis for comparison between the voltage stabilizing additives used. However, certain of the additives shown in the tables are not soluble in polyethylene to the extent used herein and, therefore, slight crystallization in certain compounds partially negated the beneficial effects of the additive liquid blend upon the polyethylene. The preferred concentration of each additive is such that its solubility in polyethylene is not exceeded. As a general rule, concentrations in the range of 0.1% up to the limit of solubility in polyethylene should be used. In considering the limit of solubility of an additive in polyethylene, the fact that the additive is first dissolved in the aromatic liquid and then added to the polyethylene should be considered as the aromatic liquid blend has been found to enhance the solubility of certain additives in polyethylene as well as to provide a convenient method for incorporating the additive into the polyethylene by tumble mixing.

As an indication of the solubility of the compounds shown in the above examples at 0.5 part by weight in 2.0 parts by weight concentration of aromatic liquid and 100 parts by weight of polyolefin base, Examples 12–24 above were inspected for the presence of crystallization in the compounds. Example 12 exhibited fine crystals. Example 14 exhibited many large crystals. Examples 18, 22, and 23 had some small crystals. The remaining compounds, i.e., Examples 13, 16, 17, 19, 20, 21, and 24 had no crystals indicating that the additives were completely soluble at those concentrations.

Another characteristic of the compounds according to my invention which must be considered is the propensity of the additive aromatic liquid blend to bloom, i.e., to separate from the polyethylene during operation or installation. Certain additive aromatic liquid blends tend to bloom more than others. For example, the compound of Example 10 exhibited very slight blooming characteristics upon standing whereas the compound of Example 11 exhibited medium blooming of a degree sufficient to make the compound undesirable for certain applications.

While a high pressure low density polyethylene composition is shown in the previous examples, it is not intended that the present invention be limited to that base material. Other polyolefins including polypropylene, low pressure high density polyethylene, mixtures of olefins, e.g., ethylene propylene rubber and similar solid olefin compositions can be used. The following are examples of such alternative base materials with voltage stabilizing additives and aromatic liquid blends incorporated therein.

EXAMPLE 72

| | |
|---|---|
| Base | 100 parts by weight isotactic polypropylene. |
| Aromatic liquid | 8 parts by weight indene. |
| Additive | .2 part by weight o-nitrobiphenyl. |

EXAMPLE 73

| | |
|---|---|
| Base | 100 parts by weight polyisobutylene. |
| Aromatic liquid | 2 parts by weight Arochlor 1242. |
| Additive | .8 part by weight 4,4'-dibromobiphenyl. |

EXAMPLE 74

| | |
|---|---|
| Base | 100 parts by weight low pressure polyethylene. |
| Aromatic liquid | 3 parts by weight quinoline. |
| Additive | .2 part by weight 9,10-dibromoanthracene. |

EXAMPLE 75

| | |
|---|---|
| Base | 100 parts by weight high pressure polyethylene containing 2–3 parts by weight di(alpha-cumyl) peroxide cross linking agent and 1 part by weight divinyl benzene. |
| Aromatic liquid | 3 parts by weight quinaldine. |
| Additive | .4 part by weight diphenylamine. |

EXAMPLE 76

| | |
|---|---|
| Base | Ethylene-propylene rubber. |
| Aromatic liquid | 3 parts by weight quinaldine. |
| Additive | .3 part by weight triphenyl formazan. |

I claim:

1. A dielectric composition consisting essentially of a major amount of a solid phase polyolefin having dispersed therein a blend of a normally liquid aromatic compound selected from the group consisting of quinaldene, quinoline, isoquinoline, indene, chlorinated biphenyl and orthonitrotoluene and a compatible voltage stabilizing additive selected from the group consisting of halogenated polycyclic aromatic compounds and susbtituted aromatic hydrocarbon compounds characterized by having an electron acceptor group and an electron donor group potentially hydrogen bonded together by a reversibly transferable proton.

2. The composition according to claim 1 in which said aromatic liquid compound is quinaldene.

3. The composition according to claim 1 in which said aromatic liquid compound is quinoline.

4. The composition according to claim 1 in which said aromatic liquid compound is isoquinoline.

5. The composition according to claim 1 in which said aromatic liquid compound is indene.

6. The composition according to claim 1 in which said aromatic liquid compound is chlorinated biphenyl.

7. The composition according to claim 1 in which said aromatic liquid compound is orthonitrotoluene.

8. The composition according to claim 1 in which said additive is selected from the group consisting of chlorinated biphenyl; 4,4' - dibromobiphenyl; 9,10 - dibromoanthracene; 4-bromobiphenyl; 4-iodobiphenyl; 2 - chloronaphthalene; 2,4,6-trinitrotoluene; 2-nitrodiphenylamine; 2,4 - dinitrodiphenylamine; o - nitroanisole; 2,6 - dinitrotoluene; 2,4-dinitroltoluene; o-nitrobiphenyl; diphenylamine; 2-nitroaniline; anthranilonitrile; 1-fluoro-2-nitrobenzene; chloranil; 2,6-dinitroaniline; diparamethoxy diphenylaminè; o-nitrotoluene; N-nitroso-N-phenyl-benzylamine; N-nitroso carbazole; p-nitrosodiphenylamine; N-nitroso-diphenylamine; azobenzene; 4-methyl - 2 - nitroaniline; p-phenyl azoaniline; ω-nitro styrene; 2,2'-dinitrobiphenyl; phenyl-alphanaphthalene; phenyl - beta - naphthalene; N,N'-diphenyl, paraphenylenediamine; benzidene; mixtures thereof, and mixtures thereof with at least one of m-dinitrobenzene, m-nitroaniline, p-nitroaniline, m-nitrotoluene, p-nitrotoluene, o-nitrochlorobenzene, and p-nitrochlorobenzene.

9. The composition according to claim 1 in which said additive is chlorinated biphenyl.

10. The composition according to claim 1 in which said additive is 4,4'-dibromobiphenyl.

11. The composition according to claim 1 in which said additive is 9,10-dibromoanthracene.

12. The composition according to claim 1 in which said additive is 4-bromobiphenyl.

13. The composition according to claim 1 in which said additive is 4-iodobiphenyl.

14. The composition according to claim 1 in which said additive is 2-chloronaphthalene.

15. The composition according to claim 1 in which said additive is 2,4,6-trinitrotoluene.

16. The composition according to claim 1 in which said additive is 2-nitrodiphenylamine.

17. The composition according to claim 1 in which said additive is 2,4-dinitrodiphenylamine.

18. The composition according to claim 1 in which said additive is o-nitroanisole.

19. The composition according to claim 1 in which said additive is 2,6-dinitrotoluene.

20. The composition according to claim 1 in which said additive is 2,4-dinitrotoluene.

21. The composition according to claim 1 in which said additive is o-nitrobiphenyl.

22. The composition according to claim 1 in which said additive is diphenylamine.

23. The composition according to claim 1 in which said additive is 2-nitroaniline.

24. The composition according to claim 1 in which said additive is anthranilonitrile.

25. The composition according to claim 1 in which said additive is 1-fluoro-2-nitrobenzene.

26. The composition according to claim 1 in which said additive is chloranil.

27. The composition according to claim 1 in which said additive is 2,6-dinitroaniline.

28. The composition according to claim 1 in which said additive is diparamethoxy diphenylamine.

29. The composition according to claim 1 in which said additive is o-nitrotoluene.

30. The composition according to claim 1 in which said additive is N-nitroso-N-phenyl-benzylamine.

31. The composition according to claim 1 in which said additive is N-nitroso carbazole.

32. The composition according to claim 1 in which said additive is N-nitroso-diphenylamine.

33. The composition according to claim 1 in which said additive is azobenzene.

34. The composition according to claim 1 in which said additive is 4-methyl-2-nitroaniline.

35. The compostition according to claim 1 in which said additive is p-phenyl azoaniline.

36. The composition according to claim 1 in which said additive is $\omega$-nitro styrene.

37. The composition according to claim 1 in which said additive is 2,2'-dinitrobiphenyl.

38. The composition according to claim 1 in which said additive is phenyl-alpha-naphthalene.

39. The composition according to claim 1 in which said additive is phenyl-beta-naphthalene.

40. The composition according to claim 1 in which said additive is N,N'-diphenyl paraphenylenediamine.

41. The composition according to claim 1 in which said additive is benzidene.

42. The composition according to claim 1 in which said additive is p-nitrosodiphenylamine.

43. The composition according to claim 1 in which the concentration of said blend is from about 1% to about 10% based upon the polyolefin.

44. The composition according to claim 1 in which voltage stabilizing additive is present in the amount of about 5 to about 50 parts by weight per 100 parts by weight of liquid aromatic compound and the concentration of the blend is about 1% to about 10% by weight based upon the polyolefin.

45. The composition according to claim 44 in which the concentration of the blend is about 2% to about 5% by weight based upon the polyolefin.

46. The composition according to claim 44 in which the concentration of the blend is about 1% to about 8% by weight based upon the polyolefin.

47. The composition according to claim 1 in which the polyolefin is polyethylene.

48. The composition according to claim 8 in which the polyolefin is polyethylene.

49. The composition according to claim 44 in which the polyolefin is polyethylene.

References Cited

UNITED STATES PATENTS 3,445,395   5/1969   Hunt _____ 252—63.2

JOHN T. GOOLKASIAN, Primary Examiner

M. E. McCAMISH, Assistant Examiner

U.S. Cl. X.R.

174—110.44; 252—65; 260—32.6, 33.6, 33.8, 45.7, 45.9

Disclaimer 3,542,684.—*George H. Hunt*, West Newton, Mass. VOLTAGE STABILIZED POLYOLEFIN DIELECTRIC COMPOSITIONS USING LIQUID-AROMATIC COMPOUNDS AND VOLTAGE STABILIZING ADDITIVES. Patent dated Nov. 24, 1970. Disclaimer filed Oct. 23, 1970, by the assignee, *Simplex Wire and Cable Company*.

Hereby disclaims the terminal portion of the term of said patent subsequent to May 19, 1986.

[*Official Gazette March 23, 1971.*]